(12) United States Patent
Hill (10) Patent No.: US 6,874,889 B1
(45) Date of Patent: Apr. 5, 2005

(54) DIFFERENTIAL RATE DOUBLE SHUTTER FOR CINEMATOGRAPHIC DIGITAL IMAGE CAPTURE CAMERAS

(75) Inventor: William A. Hill, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/449,588

(22) Filed: May 30, 2003

(51) Int. Cl.[7] ............................ G03B 1/00; G03B 9/10
(52) U.S. Cl. ...................................... 352/208; 352/166
(58) Field of Search ................................. 352/166, 208, 352/214, 216

(56) References Cited

U.S. PATENT DOCUMENTS

| | | | | |
|---|---|---|---|---|
| 744,251 | A | * 11/1903 | Smith | ........................ 352/214 |
| 4,576,456 | A | * 3/1986 | Okino et al. | ................ 352/216 |
| 4,592,632 | A | * 6/1986 | Renold | ....................... 352/214 |
| 6,734,900 | B2 | * 5/2004 | Mayhew | ................ 348/207.11 |

* cited by examiner

*Primary Examiner*—Judy Nguyen
*Assistant Examiner*—Arthur A Smith
(74) *Attorney, Agent, or Firm*—Kenneth W. Float (57) ABSTRACT

A high resolution, high frame rate digital cinematographic camera system having an improved shutter system. An exemplary digital cinematographic camera system comprises a digital camera with an image sensor, a shutter drive motor, and a double shutter system. The double shutter system comprises primary and secondary shutter blades that revolve at differential rates. A preferred double shutter comprises a 1× rotation speed primary shutter blade with an adjustable open angle of 360 degrees minus the equivalent angle read-out time of the image sensor and a 2× rotation speed secondary shutter blade with a fixed open angle of 360 degrees minus the effective clear aperture at the shutter plane. The 2× rotation speed secondary shutter blade has leading and lagging edge rates that are twice the leading and lagging edge speed of the primary shutter blade to provide additional exposure time and readout time.

5 Claims, 8 Drawing Sheets

BACK TO FIG. 3a

Fig. 4i (PRIOR ART) — EXPOSURE STOPS

Fig. 4l (PRIOR ART) — TRANSITION READ-OUT HOLD — BACK TO FIG. 4a

Fig. 4h (PRIOR ART) — EXPOSURE INTEGRATION

Fig. 4k (PRIOR ART) — TRANSITION READ-OUT HOLD

Fig. 4g (PRIOR ART) — EXPOSURE INTEGRATION

Fig. 4j (PRIOR ART) — EXPOSURE STOP

Fig. 5f (PRIOR ART)
EXPOSURE INTEGRATION

Fig. 5g (PRIOR ART)
EXPOSURE INTEGRATION

Fig. 5h (PRIOR ART)
EXPOSURE STOPS

Fig. 5i (PRIOR ART)
EXPOSURE STOP

Fig. 5j (PRIOR ART)
TRANSITION READ-OUT HOLD

Fig. 5k (PRIOR ART)
TRANSITION READ-OUT HOLD

DIFFERENTIAL RATE DOUBLE SHUTTER FOR CINEMATOGRAPHIC DIGITAL IMAGE CAPTURE CAMERAS

BACKGROUND

The present invention relates generally to digital cameras, and more particularly, to a differential rate double shutter for use with cinematography digital image capture cameras.

In the past, conventional though the lens reflex cameras, and the like, have been developed to produce moving pictures. Typical of these are the well-known ArriFlex™ film camera, PanaFlex™ film camera, and Photosonics™ film camera, for example. In these conventional cameras, the requirement for a mechanical shutter limits the readout time available for electro-optic sensors, as read-out cannot begin until the sensor is fully occluded by the shutter resulting in an image integrate period, a transition period of lost time and a read-out period. Minimizing this transition period is a constraint on the image aperture size of the camera and therefore the resolution of the camera.

For example, at 24 frames per second, a complete integrate, transition, and read-out cycle is 41.67 milliseconds long for 360 degrees. If the maximum image integration period, referred to as shutter angle, is 180 degrees (20.83 milliseconds then the transition lost time and the read-out time must total 20.83 milliseconds. For larger high resolution arrays, this becomes difficult because the lost time increases as well as the read-out time, leading to the only alternative which is to decrease the shutter angle or image integration time.

Therefore, it is an objective of the present invention to provide for increased available shutter angle at the aperture by incorporating a differential rate double shutter for use with cinematography digital image capture cameras.

SUMMARY OF THE INVENTION

To meet the above and other objectives, the present invention provides for improved electro-optic image capture cameras having a mechanical shutter, including though the lens reflex cameras. The present invention provides for a high resolution, high frame rate digital cinematographic camera systems.

An exemplary digital cinematographic camera system comprises a digital camera having an image sensor, a shutter drive motor, and a double shutter coupled to the shutter drive motor by way of a pulley system or a gear system. The double shutter comprises two shutter blade assemblies that revolve or rotate at differential rates.

The double shutter comprises a 1x rotation speed primary shutter with double blades and with an adjustable open angle set at 360 degrees minus the read-out time of the image sensor, in equivalent angular degrees for a respective frame rate, as the maximum shutter open angle and full closure as the minimum shutter open angle. The double shutter also comprises a 2x rotation speed secondary shutter blade with an open angle of 360 degrees minus the effective clear aperture of the camera at the shutter plane. The 2x rotation speed secondary shutter blade has leading and lagging edge rates that are twice the speed of the primary shutter blade to provide additional maximum exposure time and readout time.

The two shutter blades of the double shutter revolve at differential rates to achieve faster leading and lagging edges for increased exposure time and increased readout (pulldown) time at maximum open angle. The double shutter provides more exposure time than prior art implementations of rotating mechanical reflex shutters in electro-optic cameras. This advantage is particularly important for read-out of high resolution images at high frame rates.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
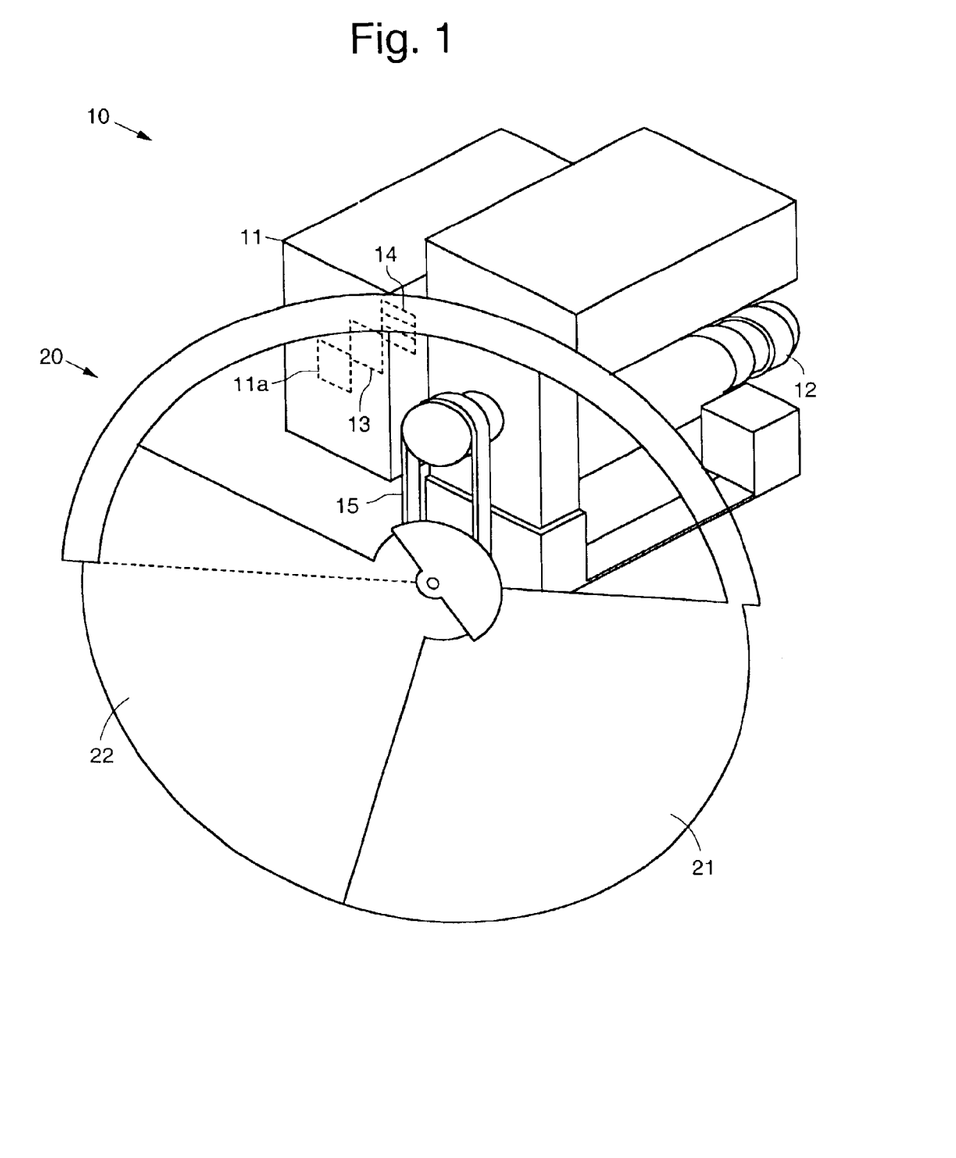
FIG. 1 is a perspective view of an exemplary digital cinematographic camera system employing a double shutter in accordance with the principles of the present invention, and wherein a shutter blade assembly fits between the back of a lens and in front of a color splitting prism in the most typical arrangement.

Referring to the drawing figures, FIG. 1 is a perspective view of an exemplary digital cinematographic camera system 10 employing a double shutter 20 in accordance with the principles of the present invention. More specifically, the exemplary digital cinematographic camera system 10 comprises a digital camera head 11 that includes a color splitting prism 13 and electro-optic sensors 14 for each color channel.

The digital camera head 11 has an effective aperture at the shutter plane 11a, that is the projection of the image sensor 14 at the entrance of the color splitting prism 13, a shutter drive motor 12, and the present double shutter 20.

The double shutter 20 is coupled to the shutter drive motor 12 by way of a pulley system 15 (or a gear system 15). The double shutter 20 comprises primary and secondary shutter blades 21, 22. The primary and secondary shutter blades 21, 22 of the double shutter 20 revolve at differential rates to achieve faster leading and lagging edges for increased exposure time and increased image sensor readout (pulldown) time.

The primary shutter blade 21 has preferably a 1x rotation speed, blade 21 has two surfaces that have an adjustable open angle set from 0 degrees to 360 degrees minus the read-out time of the image sensor 14. The secondary shutter blade 22 is preferably a 2× rotation speed blade 22 with a fixed open angle of 360 degrees minus the effective clear aperture at the plane of the shutter 20.

The 2× rotation speed secondary shutter blade 22 has leading and lagging edge rates that are twice speed of the 1× rotation speed primary shutter blade 21. This increased edge speed provides additional exposure time and image sensor readout time for the present digital cinematographic camera system 10.

The double shutter 20 provides more exposure time than currently available implementations of rotating mechanical reflex shutters in electro-optic cameras. This advantage is particularly important for reading-out high resolution images from the image sensor 14 at high frame rates.

Figure 2:
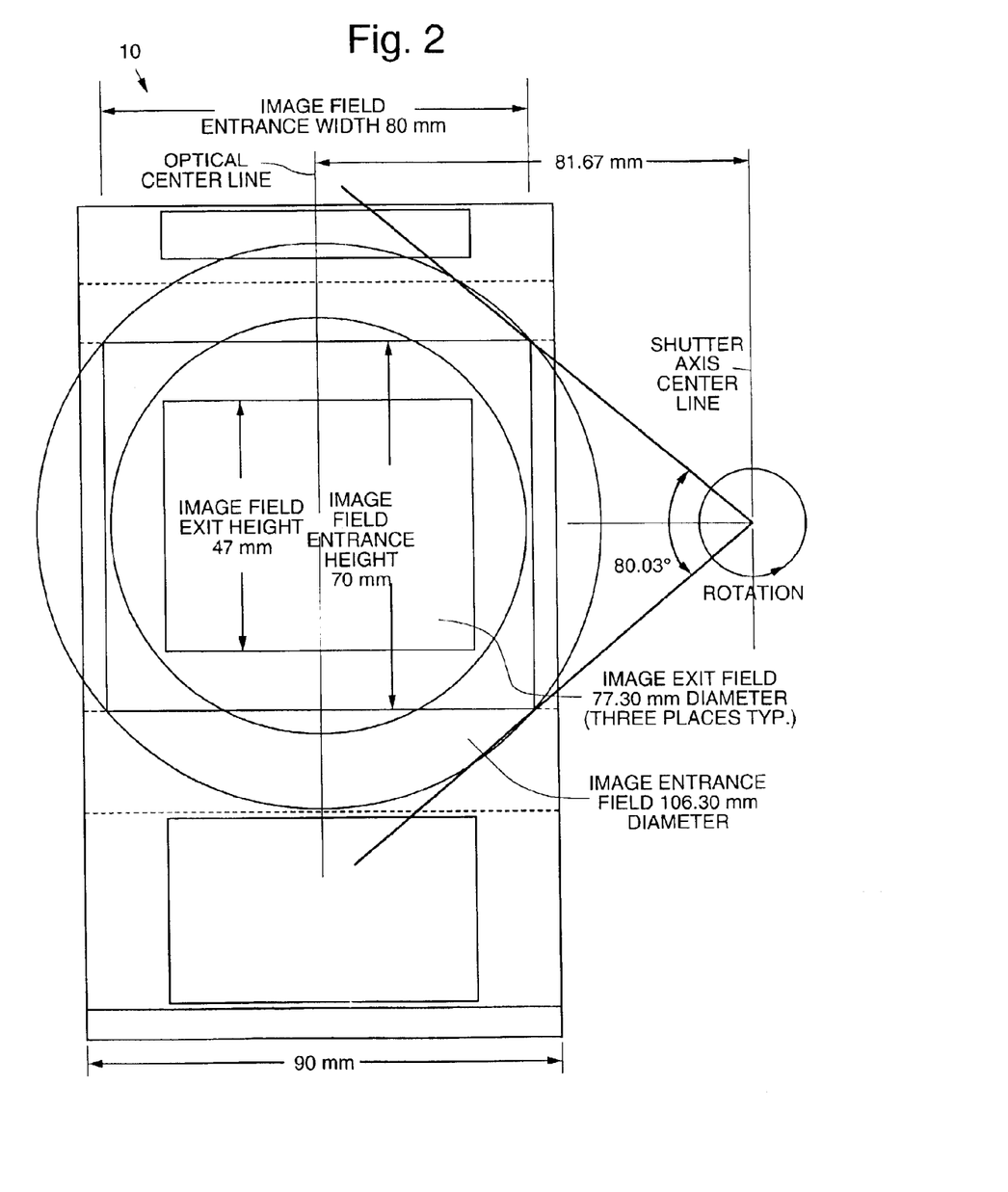
FIG. 2 illustrates a front view of the aperture of a digital cinematography camera after the lens and before the color splitting prism and electro-optic sensor indicating the most typical placement of the shutter system in FIG. 1, and wherein this figure shows a geometric field view of image aperture space as it converges from the prism entrance and focuses onto the electro-optic sensors at each of three color channel image planes.

FIG. 2 is a front view of the entrance to the prism 13 on a reduced to practice embodiment of the camera 10 shown in FIG. 1, including typical dimensions of the optical apertures. The camera head 11 has a width of 90 mm, for example, with an image field entrance width of 80 mm, and an image field entrance height of 70 mm, for example. The image entrance circular clear field is 106.30 mm in diameter, for example, and the image exit clear field is 77.80 mm in diameter, for example. In this embodiment the image field entrance height at the prism 13 is 70 mm, for example, and the image field exit height at each sensor 14 is 47 mm, for example.

Figure 3A:
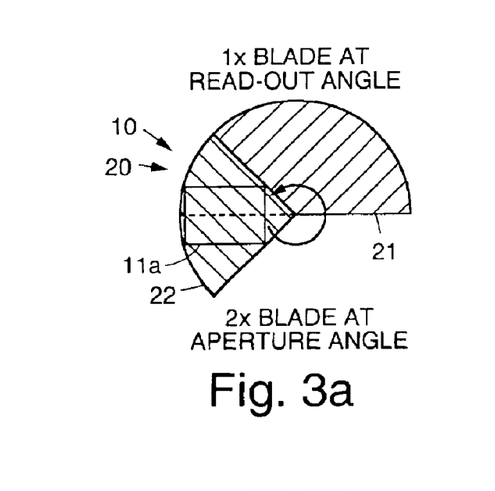
FIGS. 3a–3k sequentially illustrates operation of the exemplary double shutter system providing both full integration time and sufficient read-out time.
Figure 3B:
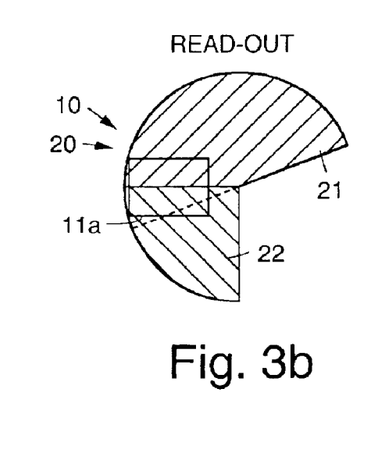
Figure 3C:
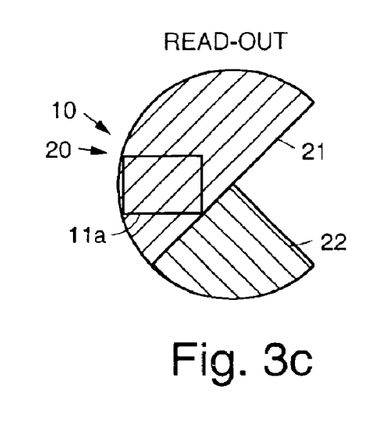
Figure 3D:
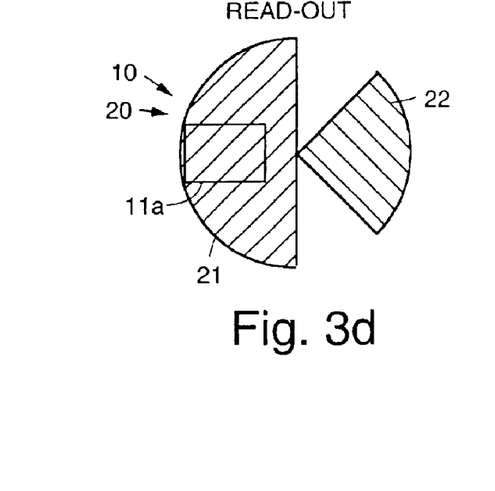
Figure 3E:
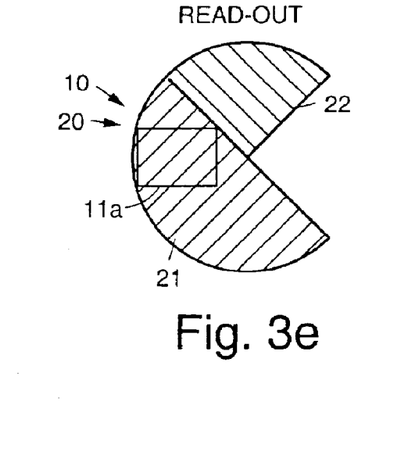
Figure 3F:
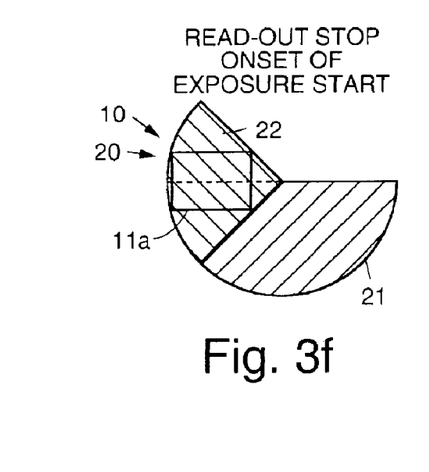
Figure 3G:
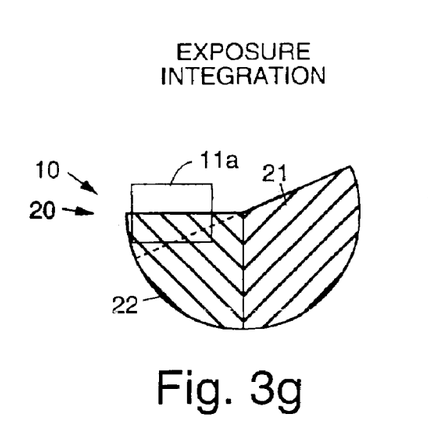
Figure 3H:
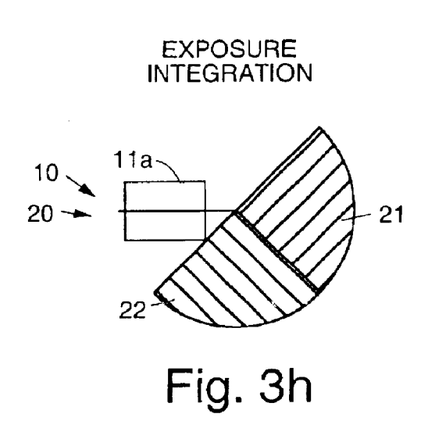
Figure 3I:
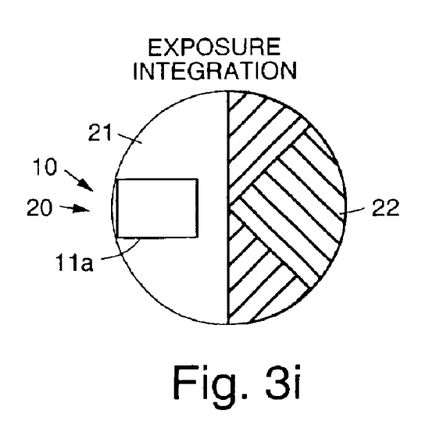
Figure 3J:
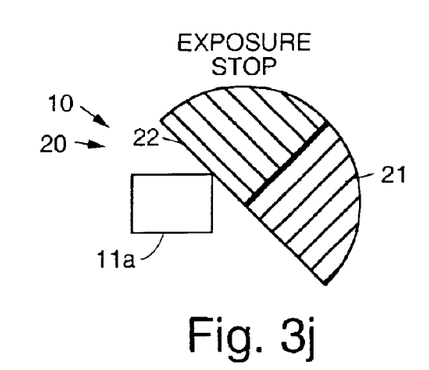
Figure 3K:
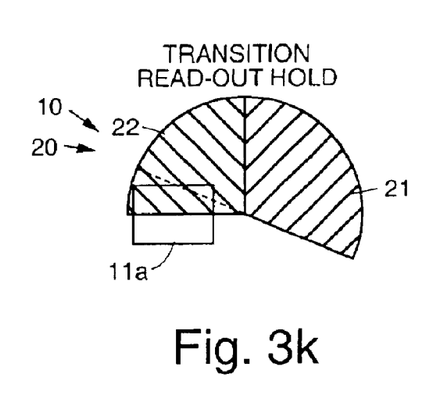

FIGS. 3a–3k are sequential views that illustrate operation of the exemplary double shutter system 20. FIG. 3a shows sensor read-out start, with total occlusion of the image sensor 14. The 1× primary shutter blade 21 is at the read-out angle for this embodiment, and the 2× rotation speed secondary shutter blade 22 is at the aperture angle for this embodiment. FIGS. 3b–3f show five stages of the read-out period. FIGS. 3b–3d show three read-out positions of the primary shutter blade 21 relative to the secondary shutter blade 22. FIG. 3f shows read-out stop and the onset of sensor exposure for the start of image integration. Also shown in FIG. 3f is the additional read-out time provided by the secondary shutter occluding the image field while the primary shutter has already exposed the sensor 14. FIGS. 3g–3k show exposure of the sensor 14 to image integration using the exemplary double shutter system 20. FIGS. 3g–3i show three stages of exposure integration and the relative positions of the primary shutter 21 and secondary shutter 22. FIG. 3j shows the reference for exposure stop while FIG. 3k shows transition or read-out hold period. It is seen that the secondary shutter occludes the image field sooner than the primary shutter, taking up less time for the transition hold period. This provides additional image integration time. After what occurs in FIG. 3k, the sequence repeats back to FIG. 3a for the next image frame.

For the purposes of completeness and comparison, two prior art shutter blade 15 and image sensor 14 arrangements are shown in FIGS. 4a–4l and FIGS. 5a–5k, where the shutter system is timed for full exposure but insufficient read-out and alternatively timed for sufficient read-out but less than full exposure, respectively.

Figure 4A:
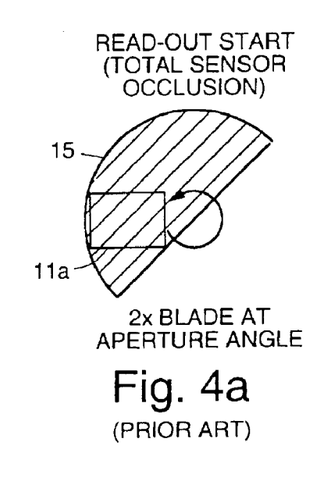
FIGS. 4a–4l sequentially illustrates operation of an exemplary prior art shutter system with less than 180 degree readout although full integration time of 180 degree exposure, and wherein camera operation under this condition causes shading as well image smearing because the image data is being read-out at the same time as the image is being integrated.
Figure 4B:
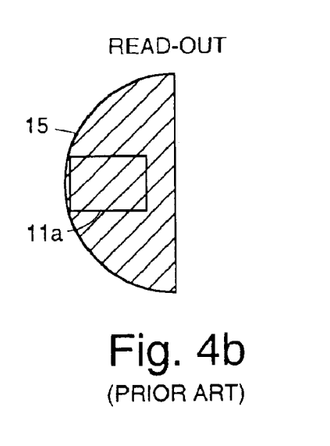
Figure 4C:
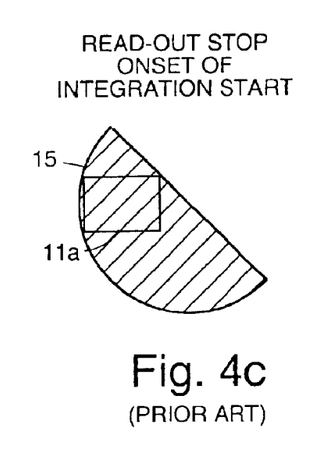
Figure 4D:
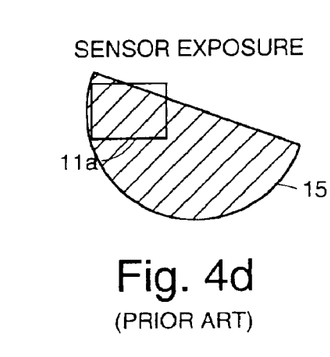
Figure 4E:
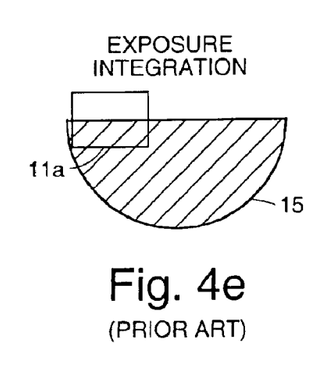
Figure 4F:
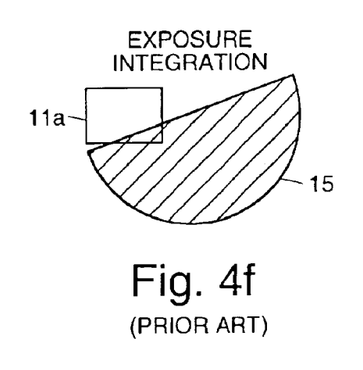
Figure 4G:
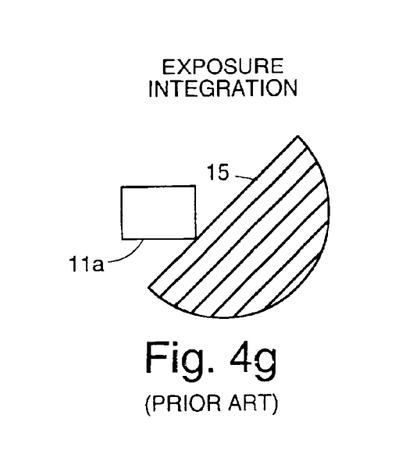
Figure 4H:
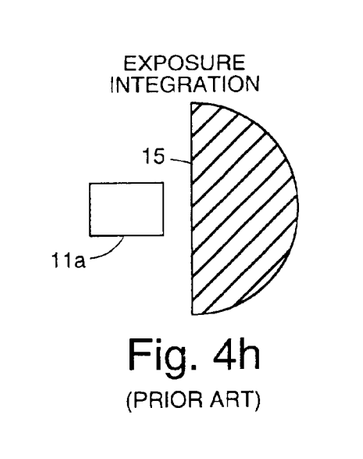
Figure 4I:
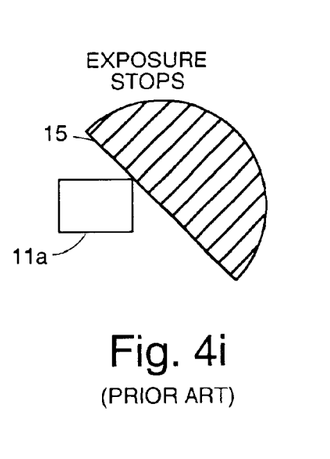
Figure 4J:
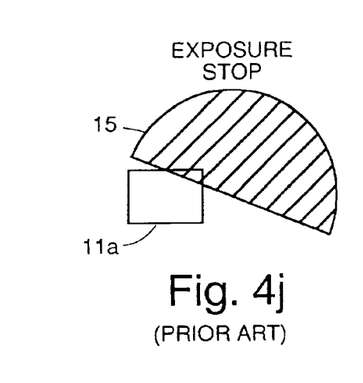
Figure 4K:
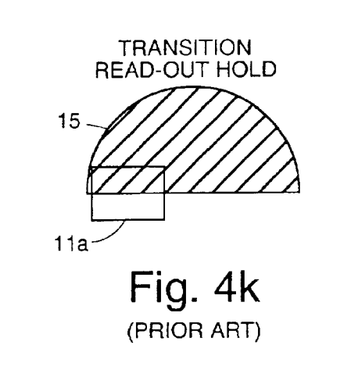
Figure 4L:
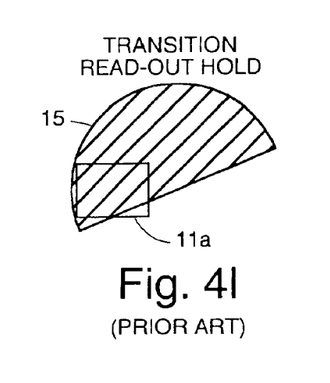

FIGS. 4a–4l are sequential views that illustrate operation of an image sensor 14 used with a typical prior art shutter system 15 with full 180 degree exposure time but less than 180 degree readout. The standard shutter timing diagram is for a 180 degree exposure time but only achieves 90 degree exposure read-out lime in this example. FIGS. 4a–4e illustrate read-out using the prior art shutter system 15. FIG. 4a shows read-out start, with total occlusion of the image sensor 14. FIGS. 4b–4d show three stages of read-out. FIG. 4e shows read-out stop and the onset of exposure and image integration. FIGS. 4f–4i show exposure integration of an image using the prior art shutter system 15. FIG. 4i shows the reference for exposure stop. FIGS. 4j–4l show stages of read-out hold period, and in particular, the lost time of transition to read out hold to prevent image smearing and shading produced if read-out starts before full occlusion of the aperture.

Figure 5A:
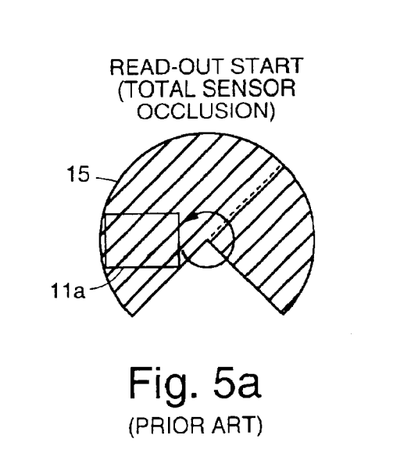
FIGS. 5a–5k sequentially illustrates operation of an exemplary prior art shutter system with sufficient readout time, in this case 180 degrees, and less than 180 degree of exposure time, and although read-out time is sufficient to not cause smearing and shading, camera operation under this condition limits image acquisition to short exposure times and does not allow full latitude long exposures.
Figure 5B:
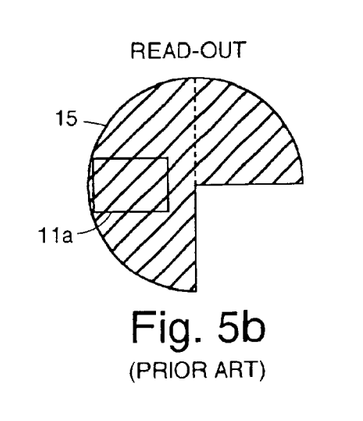
Figure 5C:
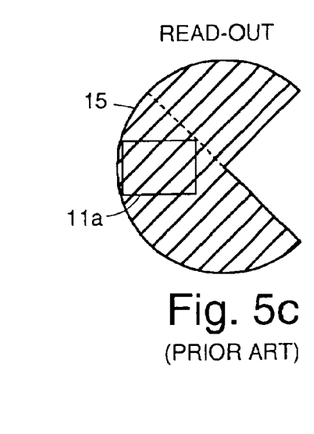
Figure 5D:
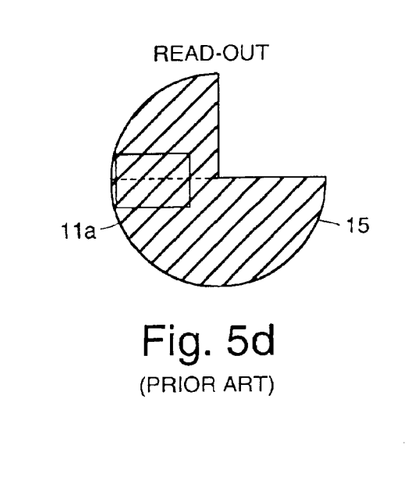
Figure 5E:
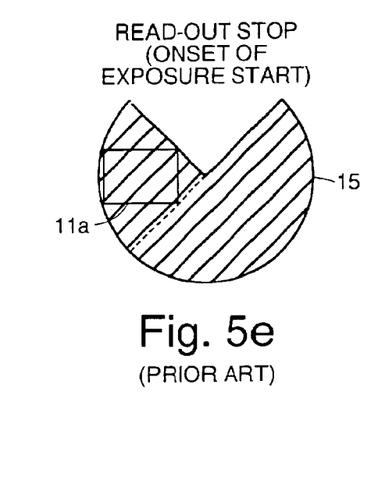
Figure 5F:
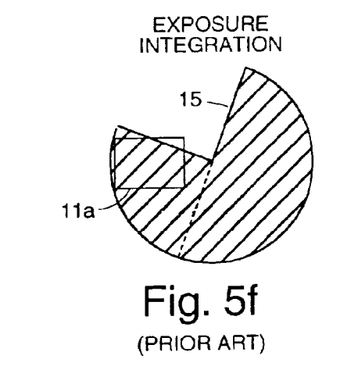
Figure 5G:
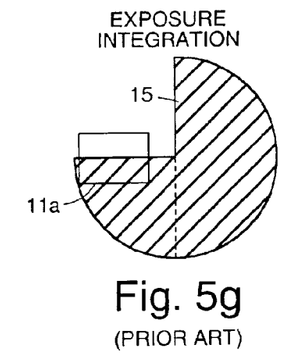
Figure 5H:
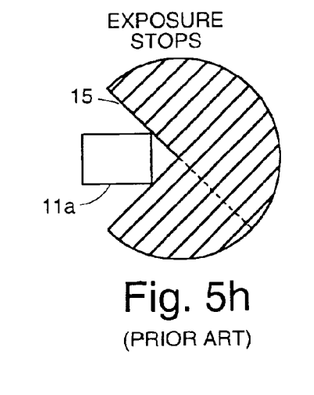
Figure 5I:
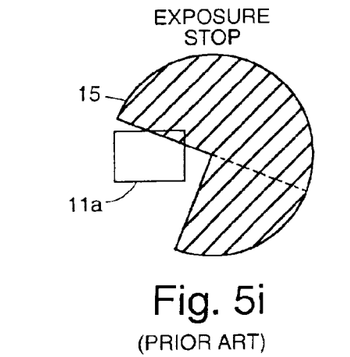
Figure 5J:
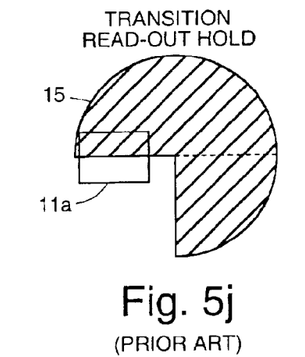
Figure 5K:
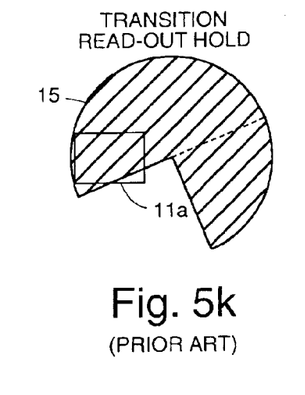

FIGS. 5a–5k are sequential views that illustrate operation of an image sensor 14 used with a typical prior art shutter system 15 with 180 degree readout and less than 180 degree exposure. The standard shutter timing diagram is for a 180 degree read-out time but only achieves 90° maximum exposure time in this example. FIGS. 5a–5d illustrate read-out. FIG. 5a shows read-out start, FIGS. 5b–5e show 180 degrees to readout stop and the onset of exposure integration start. FIGS. 5e–5h illustrate exposure and image integration, a maximum of only 90 degrees for this example. FIG. 5h shows the reference for exposure stop of the image sensor 14. FIGS. 5h–5k show transition and read-out hold with the usual lost time to prevent image smearing and shading.

The two shutter blades 21, 22 of the double shutter 20 of the present invention revolve at differential rates to achieve faster leading and lagging edges for increased exposure time and increased readout (pulldown) time compared to the conventional shutters 15 shown in FIGS. 4a–4l and FIGS. 5a–5k. The double shutter 20 provides more exposure time than current and prior implementations of rotating mechanical reflex shutters 15 in electro-optic cameras. This advantage is particularly important for read-out of high resolution images at high frame rates.

Thus, a differential rate double shutter and improved digital cinematography camera have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A cinematographic camera system comprising:
    a digital camera comprising a color splitting prism and an electro-optic image sensor for each color channel derived from the color splitting prism;
    a shutter drive motor; and
    a double shutter comprising an adjustable angle primary and fixed angle secondary shutter blades that revolve at differential rates to provide for increased exposure time and increased image sensor readout time.

2. The camera system recited in claim 1 wherein the double shutter is coupled to the shutter drive motor by way of a pulley system.

3. The camera system recited in claim 1 wherein the double shutter is coupled to the shutter drive motor by way of a geared system.

4. The camera system recited in claim 1 wherein the primary shutter blade is a 1× rotation speed blade having an adjustable open angle set from 0 degrees to 360 degrees minus the equivalent angle read-out time of the image sensor, and the secondary shutter blade is a 2× rotation speed blade having a fixed open angle of 360 degrees minus the effective clear aperture at the plane of the shutter.

5. The camera system recited in claim 1 wherein the 2× rotation speed secondary shutter blade has leading and lagging edge rates that are twice the leading and lagging edge speed of the 1× rotation speed primary shutter blade.

* * * * *